Sept. 29, 1953     C. R. LEIGHTON ET AL     2,653,712
PNEUMATIC POTATO SEPARATING MACHINE
Filed Nov. 8, 1949     2 Sheets-Sheet 1
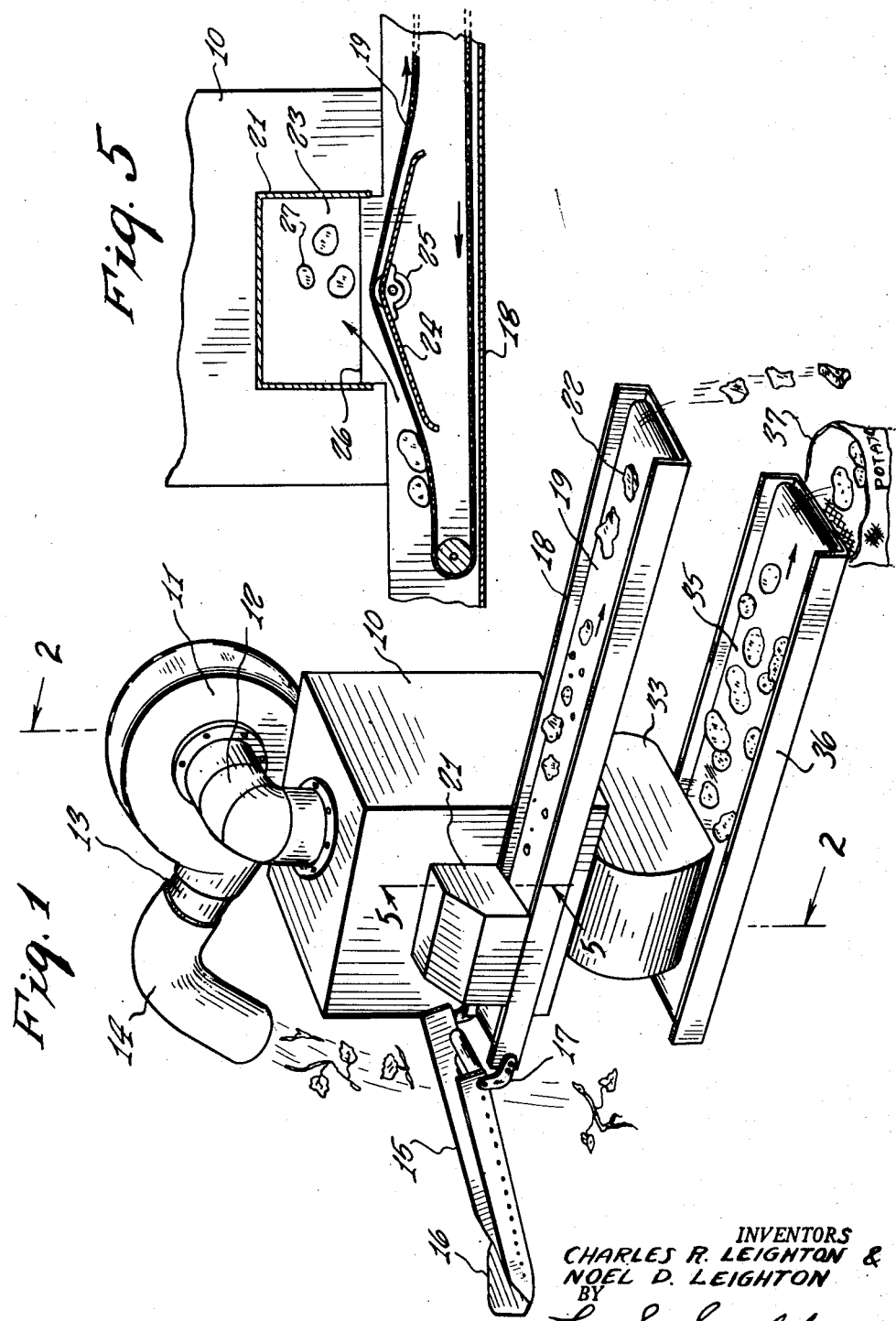
INVENTORS
CHARLES R. LEIGHTON &
NOEL D. LEIGHTON
BY
L. S. Saulsbury
ATTORNEY

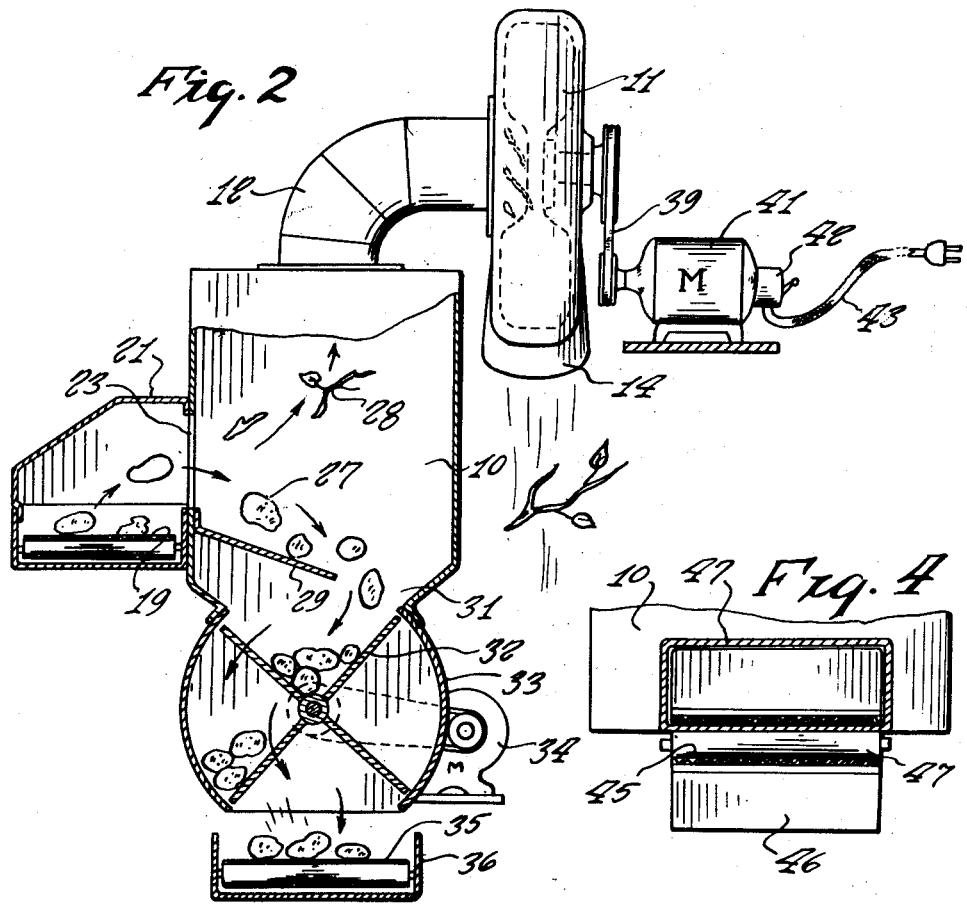
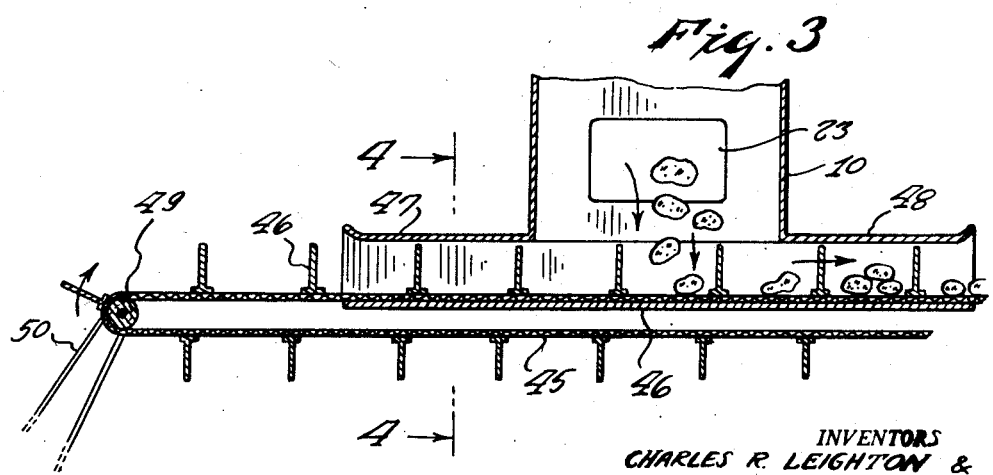

Patented Sept. 29, 1953

2,653,712

UNITED STATES PATENT OFFICE 2,653,712

PNEUMATIC POTATO SEPARATING MACHINE

Charles R. Leighton and Noel D. Leighton, Limestone, Maine

Application November 8, 1949, Serial No. 126,076

1 Claim. (Cl. 209—139)

1

This invention relates to a potato picking and separating machine.

It is an object of the present invention to provide a potato picker and separating machine which will lift potatoes with any vines or rocks among them, separate by suction the potatoes and vines from the rocks, and then by a release automatically of the suction from the vines and the potatoes, release the potatoes so that the vines will be divided therefrom and discharged separately and leaving the rocks to be discharged by the conveyor by being left on the same and by gravity free and clear of the potatoes.

Other objects of the present invention are to provide a potato picking and separating machine wherein the separation of potatoes, rocks and vines is effected, which is of simple construction, has a minimum number of parts, inexpensive to manufacture, compact and consumes little space, utilizes a single suction air stream for effecting both the separation of the potatoes from the stone and the vines from the potatoes, creates little injury to the potatoes, and efficient in operation.

For other objects and for a better understanding of the invention, reference may be had to the following detailed description taken in connection with the accompanying drawing, in which Fig. 1 is a perspective view of the machine embodying the features of the present invention and illustrating the manner in which it is operated and how potatoes, rocks and vines are separately delivered from the machine.

Fig. 2 is a vertical sectional view of the machine taken on line 2—2 of Fig. 1.

Fig. 3 is a fragmentary sectional view of a modified form of conveyor arrangement for receiving the potatoes which have been separated from the rocks and vines and for carrying such potatoes from the machine for discharge in a sack.

Fig. 4 is a sectional view taken on line 4—4 of Fig. 3.

Fig. 5 is a fragmentary longitudinal sectional view taken on line 5—5 of Fig. 1.

Referring now particularly to Figs. 1, 2 and 5, 10 represents a large suction air chamber to the upper part of which there is connected a large suction fan 11. An elbow pipe 12 is connected between the top of the chamber 10 and the suction fan 11. The suction fan has a discharge outlet 13 to which a nozzle 14 is connected and for the discharge of the potato vines in a manner to be presently described.

Potatoes bearing rocks and vines are lifted from the ground or floor by a conveyor 15 which

2 can be operated in any desired manner and which has a pointed spade 16 on its forward end. The upper end of the conveyor is supported upon brackets 17 and can pivot relative thereto. The brackets are connected to a channel guide 18 through which runs a conveyor 19 and by which the potatoes with the rocks and vines are brought under a receiving compartment or nose 21 and by which rocks 22 are discharged from the machine.

Under the compartment 21 is an opening 23 through which the potatoes and the vines are lifted under the action of the suction air created by the suction fan 11. In order that the potatoes will not have to be lifted too greatly, the conveyor 19 is elevated over a raised support 24 having an idler roller 25. The conveyor will thus run close to the lower edge of the opening 23, as indicated at 26, Fig. 5. Potatoes 27 are lifted through the opening with vines 28. Because of the size of the opening 23 a great force of the air is effected in this region, but upon the potatoes and vines entering the chamber 10, there is a sufficient reduction in the suction force as to cause the potatoes under gravity to drop from the vines onto a slide 29 which leads to an opening 31 for the deposit of the potatoes into a pipe conveyor having angularly spaced compartments. This conveyor is indicated at 32 and is rotated in a compartment 33 having curved sides. The conveyor 32 is driven by a motor 34. As the conveyor 32 is rotated, potatoes 27 are lowered to a potato conveyor belt 35 operable in channel 36. This conveyor will deposit the potatoes in a bag 37, Fig. 1.

The vines 28 will be lifted through the top of the compartment 10 and discharged from the nozzle 14. The chamber 10 is larger than the intake chamber 21 to allow the fast moving air which has been sucked through the opening 23 to slow down to a degree whereby the potatoes are released, but wherein the vines are lifted upwardly from the potatoes. Thus within the chamber 10 the vines are separated from the potatoes. In the chamber 21, the potatoes and vines are separated from the rocks or stones.

The rotary conveyor 32 is arranged to provide a substantially air tight bottom opening from the compartment so that little air is taken from the bottom of the compartment 10.

The suction fan 11 may be driven through a pulley connection 39 with an electric motor 41 having a switch 42 for controlling its operation and an inlet cable 43.

In Figs. 3 and 4, there is shown a modified form of sealing means for the bottom of compartment 10 and for the conveying of the potatoes therefrom. The potatoes are received from opening 23 and will drop into conveyor 45 having upstanding lugs 46 adapted to move the potatoes and at the same time run sufficiently close to laterally extending and flared guides 47 and 48 as to prevent a large passage of air into the chamber 10. The arrangement is such as to provide sealing means for the bottom of the chamber 10. The belt 45 slides over support 46' and under chamber 10. This belt 45 can be driven in any known manner by the provision of a driving roller 49 which is driven by a pulley belt 50.

It should now be apparent that there has been provided a picking and separating machine for potatoes and the like vegetables wherein the same air stream serves not only to lift the vines from the stones and potatoes, but also to bodily lift the potatoes from the stones and wherein automatically upon the potatoes being drawn through a small opening they will be released to lift the vines which have passed the small opening with the potatoes from the potatoes and to allow the potatoes to drop from the compartment 10 free of stones and of the vines 28. There is provided generally a compartment 10 from which air is sucked by a suction fan 11 and a moving conveyor which is connected in a substantially air tight manner to the bottom of the chamber 10 and is so constructed that it can remove the potatoes from the compartment 10 without interfering with the suction air stream which conveys, lifts and separates the several component parts.

While the arrangement has been illustrated for use with potatoes, it will be understood that it can be used with beets or other vegetables which grow in the ground and which need to be separated from the rocks and vines. The machine can be used on a carriage to effect the digging and lifting of the potatoes with the stones and vines by the conveyor 15.

While various changes may be made in the detail construction, it shall be understood that such changes shall be within the spirit and scope of the present invention as defined by the appended claim.

What is claimed is:

A pneumatic machine for separating potatoes from stones and vines comprising a horizontally-extending belt conveyor for conveying the potatoes, stones and vines, a main potato and vine receiving compartment having a vertical wall portion lying flush with the side of the conveyor, said vertical wall portion having a restricted window opening through which the potatoes and vines may be drawn, a suction head projecting from the vertical wall portion of the compartment from above the restricted window opening and over the belt conveyor to direct the potatoes and vines toward the restricted opening, said belt conveyor having a raised belt support centralized under said suction head to a point near to the restricted opening, suction fan means connected to the compartment at an elevated location thereon to draw the potatoes and vines from the conveyor and through the restricted opening and to remove the vines from the compartment, vane conveyor means connected to the compartment at a bottom location thereon for discharging the potatoes therefrom and a downwardly and inwardly inclined slide for the potatoes connected to the vertical wall portion immediately below the restricted opening thereof.

CHARLES R. LEIGHTON.
NOEL D. LEIGHTON.

References Cited in the file of this patent

UNITED STATES PATENTS

| Number | Name | Date |
|---|---|---|
| 1,235,406 | Williams | July 31, 1917 |
| 1,298,086 | Pallanach | Mar. 25, 1919 |
| 1,597,261 | Bishop | Aug. 24, 1926 |
| 1,753,573 | Lorentz | Apr. 8, 1930 |
| 1,828,261 | Stoltenberg | Oct. 20, 1931 |
| 2,173,088 | Eissmann | Sept. 19, 1939 |
| 2,204,032 | Whitlock | June 11, 1940 |
| 2,294,086 | Hinds | Aug. 25, 1942 |
| 2,446,646 | Forrest | Aug. 10, 1948 |
| 2,448,446 | La Pointe | Aug. 31, 1948 |

FOREIGN PATENTS

| Number | Country | Date |
|---|---|---|
| 564,839 | Germany | May 27, 1930 |
| 13,459 | Australia | July 13, 1933 |
| 152,586 | Austria | Feb. 25, 1938 |

OTHER REFERENCES

R. Kohn, "Separations in an Air Stream," American Miller and Processor, March 1944, page 33.